Figure 1:
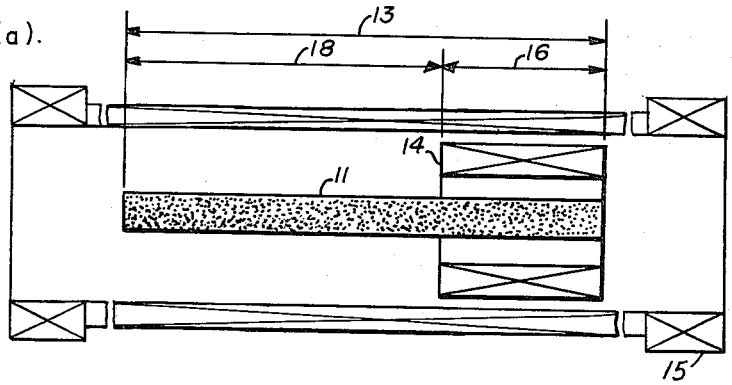
Figure 1:
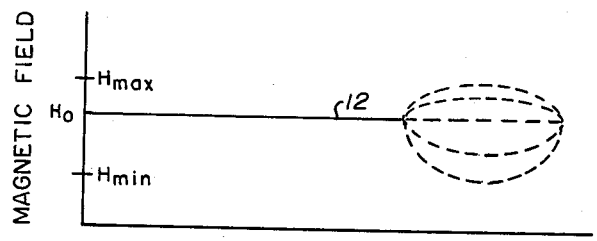

Dec. 31, 1963  L. S. HALL  3,116,209
METHOD FOR EXCHANGING ENERGY WITH A PLASMA BY MAGNETIC PUMPING
Filed Feb. 21, 1962

INVENTOR.
LAURENCE S. HALL
BY
ATTORNEY

United States Patent Office 3,116,209
Patented Dec. 31, 1963

3,116,209
METHOD FOR EXCHANGING ENERGY WITH A PLASMA BY MAGNETIC PUMPING
Laurence S. Hall, Livermore, Calif., assignor to the United States of America as represented by the United States Atomic Energy Commission
Filed Feb. 21, 1962, Ser. No. 174,925
5 Claims. (Cl. 176—3)

The present invention is related in general to methods for heating or extracting energy from a plasma and, in particular, to a method for exchanging energy with a plasma by employing a continuous-wave, saw-toothed, or other non-sinusoidal, time-varying magnetic field.

One of the more important problems facing the various approaches to controlled thermonuclear fusion today is the possibility of heating a previously prepared plasma to temperatures at which the thermonuclear interactions can readily occur. In particular, the possibility of utilizing sinusoidally oscillating magnetic fields to alternately compress and expand the plasma (magnetic pumping) has received a great deal of attention. In such utilization of sinusoidally oscillating magnetic fields, the second law of thermodynamics guarantees that a certain amount of irreversibility, and thus heating, will occur. However, the efficiency attainable by use of the irreversible effects alone leaves much to be desired.

The method of the present invention, therefore, removes the method of magnetic pumping of plasma from the category of an irreversible, thermodynamic effect, and utilizes such method directly for incorporating reversible heating mechanisms. (In a certain sense, this is analogous to heating in the manner of a Carnot cycle with ordinary thermodynamic problems.) The gain in efficiency is sufficient to warrant the extra effort necessary in providing a source of high power RF with the desired waveform and presents an attractive heating scheme, even for plasmas sufficiently hot that the collision frequency is very low. In addition, under certain circumstances discussed below, it is possible to extract energy from a plasma by these methods. This suggests the application whereby energy is extracted from a thermonuclearly heated plasma by reversing the thermodynamic cycle.

Therefore, it is an object of the present invention to provide a method for heating a plasma by magnetic pumping.

It is another object of the present invention to provide a method for heating a plasma by means of a saw-toothed or other non-sinusoidal, time-varying magnetic field.

It is still another object of the present invention to provide a method for extracting heat from a plasma by interchanging the time constants of the non-sinusoidal, time-varying magnetic field with respect to those used for heating the plasma.

Yet another object of the present invention is to provide a method for raising the temperature of a plasma by collision heating by applying a continuous-wave, non-sinusoidal magnetic field.

Yet a further object of the present invention is to provide a method for changing the temperature of a plasma by transit-time magnetic pumping by applying a continuous-wave, non-sinusoidal, time-varying magnetic field.

Figure 2:
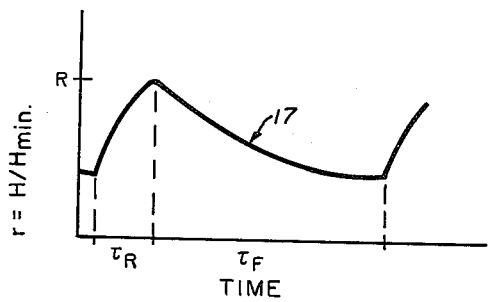
Figure 3:
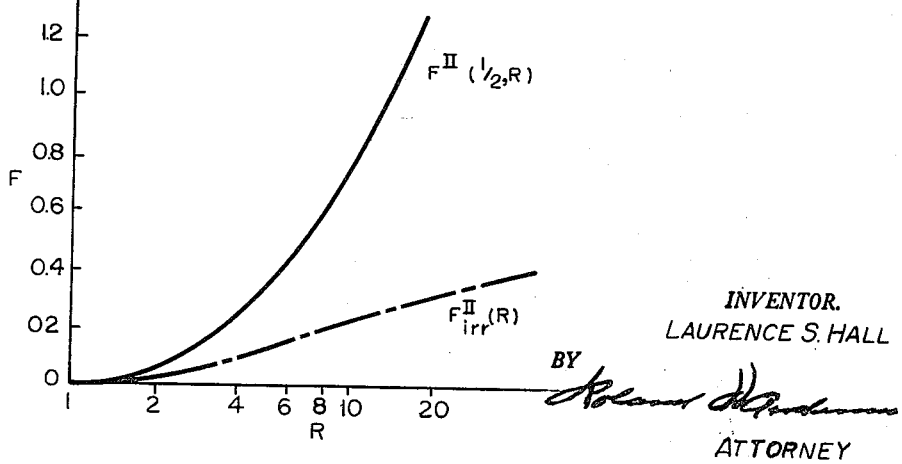

Other objects and advantages will be apparent in the following description and claims considered together with the accompanying drawing, in which:

FIGURE 1, portion $a$, is a simplified schematic cross sectional view of apparatus utilized in accordance with the concept of the present invention, FIGURE 1, portion $b$, depicts a typical plot of the spatial form of the magnetic field of the apparatus of FIGURE 1($a$), FIGURE 2 is a typical plot of the shape of the oscillating, magnetic-field waveform with respect to time applied to the apparatus of FIGURE 1, and FIGURE 3 is a plot comparing the heating ratio per cycle for various heating cases in the apparatus which are described below.

Although the method of the present invention is herein particularly described with relation to a single, limiting case and briefly with respect to two other limiting cases, and with respect to only one apparatus as shown in FIGURE 1, it is to be understood that there are various ways (or apparatus) for applying the concept of the present invention, as well as several other limiting cases. That is, any means of applying a non-sinusoidal magnetic field in the manner of magnetic pumping, as is known in the art, may be employed in the conduct of the present method.

Referring to the figures, there is shown a cylindrically symmetric rod of plasma 11, confined radially by the presence of a static magnetic field 12 of magnitude $H_0$ and of overall length 13. For example, length 13 might represent the distance around a closed loop of plasma, such as, for example, the plasma loop in a stellerator device, or it might represent the distance between two, strong magnetic mirrors in a straight plasma column of a magnetic-mirror device, such as depicted by numeral 15. Located somewhere within the volume L of the length 13 (as computed per unit cross-sectional area), is a heater 14 of length 16 comprising a magnetic coil capable of imposing a time-varying magnetic field of the form indicated in FIGURE 2 by numeral 17. Instead of a single period, as in a sinusoidal curve form, there are now two time constants associated with the oscillating magnetic field: $\tau_R$, the time in which it takes the field to rise from its minimum value to its maximum; and $\tau_F$, the time it takes the magnetic field to fall back (or decay) to its smallest value. (There are actually two relevant transit times as well; that appropriate to traversal of $L_H$, length 16 of the heater, and that appropriate to traversal of L, the overall length 13. Since $L_H$ is always of the order of L in the optimum situation, there will be no attempt to distinguish between these two relevant transit-time quantities in the description of the present invention.)

In the situation which can be expressed as $$\tau_{cy} \ll \tau_R \ll \tau_{tr}, \tau_{coll}$$

(where $\tau_{cy}$ is the cyclotron period of a charged particle's orbit in the external magnetic field, $\tau_{tr}$ is the time of transit of a typical ion through the length 16, and $\tau_{coll}$ is the time for a 90° deflection of an ion due to collisions), the three limiting cases are herein considered:

(I) $\qquad\qquad \tau_{coll} \ll \tau_F \ll \tau_{tr}$ collison heating;

(II) $\qquad\qquad \tau_{tr} \ll \tau_F \ll \tau_{coll}$ transist-time heating;

(III) $\qquad\qquad \tau_{tr} \ll \tau_{coll} \ll \tau_F$ collisional transit-time heating. Cases I and II correspond roughly to the collsion heating and transit-timing heating limits, respectively, of the irreversible theory. Case III is a hybrid limit which has some of the features of each of the previous cases. In all instances, the rising magnetic field corresponds to an adiabatic magnetic compression (the word magnetic referring to a compression in which the magnetic moments of the individual particles are conserved) in which the ions originally inside the heater 14 find their transverse energy increased by a factor R, the ratio of final-to-initial magnetic field in the compression. As previously mentioned, disclosure of the present invention is particularly drawn to the preferred Case II, supra, and briefly drawn to the alternative Cases I and III.

Therefore, if the magnetic field is decompressed slowly, as specified by the above-noted different Cases I, II, and III, there results the following:

*Case I.*—The ions distribute their energy continuously among all three degrees of freedom, resulting in an adiabatic (in the thermodynamic sense) decomposition with $\gamma = 5/3$. The net effect of the whole cycle is to transfer the heat to the plasma equally in each of three degrees of freedom.

*Case II.*—The ions originally in the heater 14 region mix irreversibly with those in the external regions shown as length 18 in FIGURE 1, effectively reducing the average transverse energy of the ions in the heater 14. Thus, the cooling effect of an adiabatic decomposition is essentially reduced by the ratio $$\lambda = \frac{(L_H/V_\parallel^H)}{(L_H/V_\parallel^H) + (L_E/V_\parallel^E)} \quad (1)$$

where $V_\parallel^H$ and $V_\parallel^E$ are the ions' longitudinal velocities in the heater 14 and external regions (numeral 18), respectively. The factor $\lambda$ occurs since each ion is in the heater 14 only this fraction of the time. This case also results in a net heat transfer to the plasma 11, but in this situation, the energy is all put into the longitudinal motion (since the magnetic moments of the individual particles are conserved throughout the process).

*Case III.*—As in Case II, the ions mix irreversibly throughout the whole volume L of length 13. However, in this case, the energy goes into all three degrees of freedom and the decomposition is to be considered adiabatic (in the thermodynamic sense) with $\gamma = 5/3$.

To calculate $\Delta \epsilon$ (the net heat transfer over a complete cycle normalized so as to be computed per particle in the whole volume L of the length 13), let T denote the ambient temperature of the ions and utilize subscripts $\parallel$ and $\perp$ as necessary to distinguish between the longitudinal and transverse directions, respectively. $\Delta \epsilon$ is counted positive if energy goes into the plasma.

Thus, referring to Case I, the transverse energy of particles inside the heater 14 after compression is $RkT$, whereas the parallel energy remains at the value $(\frac{1}{2})kT$ ($k$=Boltzmann's constant). Hence, after a time of the order of $\tau_\text{coll}$, the average energy per particle in the volume $L_H$ of length 16 is $(\frac{1}{2})(2R+1)kT$. Then since these particles do not move out of the heater 14 during $\tau_F$, the energy per particle in the volume $L_H$ after the adiabatic decomposition ($\gamma = 5/3$) is just $$(\frac{1}{2})R^{-2/3}(2R+1)kT$$

Defining $$\lambda_0 = L_H/L \quad (2)$$

we obtain the average energy gain per cycle per particle in L (for Case I).

$$\Delta \epsilon^\text{I} = \lambda_0 [(\frac{1}{2})R^{-2/3}(2R+1) - 3/2]kT \quad (3)$$

Clearly, $$\Delta \epsilon^\text{I} > 0 \text{ for } r > 1 \quad (4)$$

In the transit-time heating, Case II of previous mention, the transverse energy of particles inside the heater 14 after compression is also $RkT$ (see FIGURE 2), whereas the parallel energy remains at the value $(\frac{1}{2})kT$. During decompression, utilizing the conservation of the magnetic moment and the definition of $\lambda$ of previous mention, there results the relation $$d(\ln \epsilon_\perp^\text{II}) = \lambda d(\ln r) \quad (5)$$

where $\epsilon_\perp^\text{II}$ is the perpendicular energy and $r$ is the ratio (inside the heater 14) of the instantaneous magnectic field to the magnetic field at the minimum of the cycle (see FIGURE 2) of the heating case II. Because of the constancy of the total energy and of the magnetic moment of an individual particle, the ions' longitudinal velocities will be greatest at a position of field minimum and least at the field maximum with the actual values of $V_\parallel^H/V_\parallel^E$, depending on the individual particle. If $H_\text{max}$, the maximum magnetic field in the heater 14, is greater than $H_0$, the field in the external region, some of the cooler particles will be entirely reflected near the peak of the cycle. Thus, depending on the D.C. bias of the magnetic field in the heater 14, the average value of $\lambda$ can tend to be either larger or smaller than $$\lambda_0 (=L^H/L)$$

In particular, it seems most advantageous to set the maximum magnetic field in the heater 14 equal to $H_0$.

If $H_\text{max} = H_0$, then $\lambda$ tends to be less than $\lambda_0$ because of the direction of the magnetic field gradient, and a pessimistic estimate of the net heating per cycle is obtained by substituting $\lambda_0$ for $\lambda$ in the above Equation 5. The equation can then be integrated to obtain the energy given to the coils by each kind of particle ("heated" and "unheated") during the decompression. Thus, $$\Delta \epsilon^\text{II} > \Delta \epsilon_0^\text{II} \cong \{ [\lambda_0 R + (1-\lambda_0)]R^{-\lambda_0} - 1\} kT_\perp \quad (6)$$

where the energy is again computed per particle in the total volume L of the length 13. As mentioned previously, the constancy of the magnetic moment requires the transverse energy of a given particle in the heater 14 to be the same before and after the heating cycle, so that $$\Delta \epsilon_\parallel^\text{II} = \Delta \epsilon^\text{II}; \quad \Delta \epsilon_\perp^\text{II} = 0 \quad (7)$$

and $$\Delta \epsilon^\text{II} > \Delta \epsilon_0^\text{II} > 0 \text{ for } R > 1 \quad (8)$$

The optimum value of $\lambda_0$ may be found by differentiating Formula 6 whence $$\lambda_0^\text{opt} = (\ln R)^{-1} - (R-1)^{-1} \quad (9)$$

Thus, $\lambda_0^\text{opt}$ is less than $\frac{1}{2}$ for all R greater than unity, but it drops slowly, going from the value 0.5 in the limit $R=1$ to about 0.3 for $R=10$.

Referring now to the case of the hybrid collisional and transit-time heating (Case III above), the compression calculation is again unchanged from that of the previous computations. In decompressing, the volume increases by the factor $$(L_E + RL_H)/L = 1 + (R-1)\lambda_0 \quad (10)$$

if we assume as in Case II that $H_\text{max} = H_0$. Hence $$\Delta \epsilon^\text{III} > \{[\lambda_0(2R+1)/2 + 3(1-\lambda_0)/2]$$
$$[1 + (R-1)\lambda_0]^{-2/3} - 3/2\}kT \quad (11)$$

or $$\Delta \epsilon^\text{III} > \Delta \epsilon_0^\text{III} \cong \{[3/2 + \lambda_0(R-1)][1 + \lambda_0(R-1)]^{-2/3} - 3/2\}kT \quad (12)$$

In general, in comparing the heating cycles, $\lambda_0$ can be chosen (within the range $0 \leq \lambda_0 \leq 1$) so as to maximize the heating for a given value of R in any one of the three cases considered. In both cases involving collisions, the optimum choice (at least on the basis of the pessimistic estimate of the effects of phase mixing) is at $\lambda_0 = 1$. This is with the assumption that it is as easy to provide a big heater as it is to provide a small one. Indeed, $\Delta \epsilon_0^\text{III}$ is equal to $\Delta \epsilon^\text{I}$ in both the limits $\lambda_0 = 1$ and $\lambda_0 = 0$ (no heater). Hence, whenever $\tau_\text{tr} \ll \tau_\text{coll} \ll \tau_F$, the gains from phase mixing, which are the bases of transit-time heating, are not sufficient to compensate for the losses in collision heating, at least on the basis of the present pessimistic estimate, and it pays to make the heater as large as possible.

We may define the heating ratio for Case II $$F^\text{II}(\lambda_0, R) = \Delta \epsilon_0^\text{II}/kT_\perp \quad (13)$$

$F^{II}(\frac{1}{2}, R)$ is shown in FIGURE 3 as compared to the relation $$F_{irr}^{II}(R) \cong 0.4[(R-1)/(R+1)]^2 \quad (14)$$

which is the comparable quantity computed on the basis of the irreversible theory of transit-time heating, assuming the same value of $T_1$. Similar comparisons may be made using the other listed cases.

Method II is exemplified by the following parameters; a plasma of $10^{13}$ particles/cm.$^3$ occupying a column of radius 1 cm. and length 50 cm., with a heater of length 10 cm., and having an ambient temperature of $10^3$ ev., and with $\tau_R \cong .5$ μsec., $\tau_F \cong 5$ μsec. In such a case, taking $R=2$ enables a transfer of approximately 10 kw. of power to the plasma.

Cooperative interactions may take the place of collisions in preventing very large differences between $T_1$ and $T_{11}$ in the case of transit-time heating; for example, through the effects of so-called fire-hose instabilities. (Where such effects are not sufficient as they naturally occur, they may be promoted by supplying a region of reduced static magnetic field somewhere in the length 18. Alternately, it is sometimes desirable to introduce regions of (spatially) rapidly varying magnetic fields in which the particles' magnetic moments are no longer conserved, and which then effectively act as artificial scatterers in smoothing out the velocity-space anisotropies.) In any event, the fact that transit-time magnetic pumping only increases the energy of the parallel motion is not a prohibitively serious difficulty.

In order to remove heat from the plasma, consider again Case II. It is only necessary to interchange the orders of magnitude of $\tau_R$ and $\tau_F$ in order to change the sign of $\Delta\epsilon^{II}$ in (6). Thus, such a scheme is useful for extracting energy from a plasma heated, for example, by nuclear reactions.

While the invention has been disclosed herein with respect to a preferred and two alternative embodiments (as related to a single apparatus for performing the three embodiments), it will be apparent that numerous variations and modifications may be made within the spirit and scope of the invention, and thus it is not intended to limit the invention except by the terms of the following claims.

What is claimed is:

1. A method of heating a plasma, comprising the steps of,
   (a) Confining a plasma by a first externally-imposed static magnetic field, said first magnetic field having a constant magnitude $H_0$ for at least a substantial portion thereof,
   (b) Applying a second externally-imposed time-varying magnetic field to at least a portion of said confined plasma,
   (c) Causing said time-varying field to rise from a magnitude $H_{min}$ to a magnitude $H_{max}$ in a time interval $t_R$,
   (d) Causing said time-varying field to decrease from said magnitude $H_{max}$ to said magnitude $H_{min}$ in a time interval $t_F$, wherein the following time relationships are simultaneously satisfied:
      (1) $t_R$ is substantially less than $t_F$,
      (2) Both $t_R$ and $t_F$ are substantially greater than $t_{cy}$, where $t_{cy}$ is the cyclotron period,
      (3) $t_{cy} \ll t_R \ll t_{tr}$, $t_{coll}$; where $t_{tr}$ is the ion transit time, and $t_{coll}$ is the time for a 90° deflection of an ion,
   (e) And repeating steps (b) through (d) above until the desired plasma temperature is reached.

2. The method of claim 1 additionally defined by $t_{coll} \ll t_F \ll t_{tr}$.

3. The method of claim 1 additionally defined by $t_{tr} \ll t_{coll} \ll t_F$.

4. The method of claim 1 additionally defined by $t_{tr} \ll t_F \ll t_{coll}$.

5. The method of claim 4 wherein said plasma has a density of $10^{13}$ particles/cm.$^3$, and ambient temperature of $10^3$ ev before heating, and occupies a cylindrical column of radius 1 cm. and length 50 cm.; $t_R = 0.5$ μsec. and $t_F = 5$ μsec.; and the ratio of the maximum value of said second magnetic field to the value of said first magnetic field equals two (2).

References Cited in the file of this patent

UNITED STATES PATENTS

| | | |
|---|---|---|
| 2,910,414 | Spitzer | Oct. 27, 1959 |
| 2,946,914 | Colgate et al. | July 26, 1960 |
| 2,991,238 | Phillips et al. | July 4, 1961 |

FOREIGN PATENTS

| | | |
|---|---|---|
| 230,936 | Australia | Nov. 1, 1960 |
| 830,256 | Great Britain | Mar. 16, 1960 |
| 859,447 | Great Britain | Jan. 25, 1961 |

OTHER REFERENCES

Samuel Glasstone et al.: Controlled Thermonuclear Recations, D. Van Nostrand Co., N.Y., 1960, pp. 134–137.